United States Patent [19]

Stachel, deceased et al.

[11] 3,894,015

[45] July 8, 1975

[54] BASICALLY SUBSTITUTED 1(2H)-PHTHALAZINONE DERIVATIVES

[75] Inventors: Adolf Stachel, deceased, late of Frankfurt am Main; by Lydia Katharina Stachel, heiress, Offenbach; Rudi Beyerle, Bruchkobel; Wilhelm Kunze, Bad Homburg v.d.H.; Rolf-Eberhard Nitz, Bergen-Enkheim; Josef Scholtholt, Frankfurt, all of Germany

[73] Assignee: Cassella Farbwerke Mainkur Akt., Frankfurt am Main-Fechenheim, Germany

[22] Filed: May 11, 1973

[21] Appl. No.: 359,405

Related U.S. Application Data

[62] Division of Ser. No. 237,957, March 24, 1972, Pat. No. 3,845,052.

[30] Foreign Application Priority Data

Mar. 27, 1971 Germany............................ 2114884

[52] U.S. Cl............260/247.2 A; 260/243 B; 260/247.2 B; 260/250 P; 424/246; 424/248; 424/250

[51] Int. Cl.² ........................................ C07D 51/06

[58] Field of Search... 260/247.2 B, 250 P, 247.2 A, 260/243 B

[56] References Cited

OTHER PUBLICATIONS

Kost, An. et al., Khim. Ferm. Zh 1(3), 43–47 (1967).

*Primary Examiner*—Anton H. Sutto
*Assistant Examiner*—Paul J. Killos
*Attorney, Agent, or Firm*—Francis M. Crawford

[57] ABSTRACT

The present invention relates to new pharmacologically valuable basically substituted 1(2H)-phthalazinone derivatives having excellent coronary dilator properties and which have the general formula

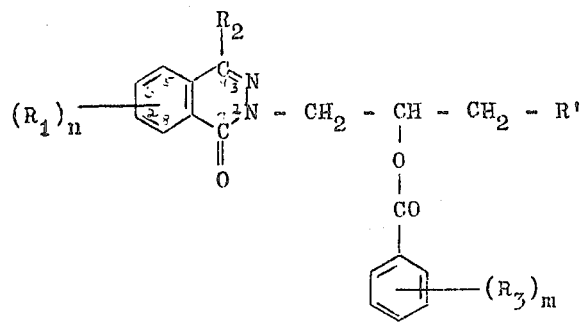

and their pharmaceutically acceptable acid addition salts, wherein R' stands for a radical selected from the group consisting of secondary aliphatic, cycloaliphatic and araliphatic amines having 2 to 10 carbon atoms and 5,6 or 7-membered heterocyclic nitrogen bases, which contain in addition to the nitrogen atom a corresponding number of methylene groups as well as, optionally, an additional member selected from the group consisting of a nitrogen, an oxygen and a sulfur atom, said radical being bound via a nitrogen atom, $R_1$ stands for a member selected from the group consisting of a hydrogen atom and alkoxy radical having 1 to 4 carbon atoms, which radical may be in the 6,7, 7,8 or 5,6,7 position of the phthalazine nucleus, $R_2$ is a member selected from the group consisting of hydrogen, alkyl and aralkyl, $R_3$ stands for alkoxy groups having 1 to 4 carbon atoms $m$ is an integer selected from 1, 2 and 3 and $n$ is an integer selected from 2 and 3; and to processes for producing said derivatives.

6 Claims, No Drawings

BASICALLY SUBSTITUTED 1(2H)-PHTHALAZINONE DERIVATIVES

The present application is a division of our Ser. No. 237,957, filed Mar. 24, 1972, now U.S. Pat. No. 3,845,052.

The present invention relates to new, pharmacologically valuable, basically substituted 1 (2H)-phthalazinone derivatives having the general formula

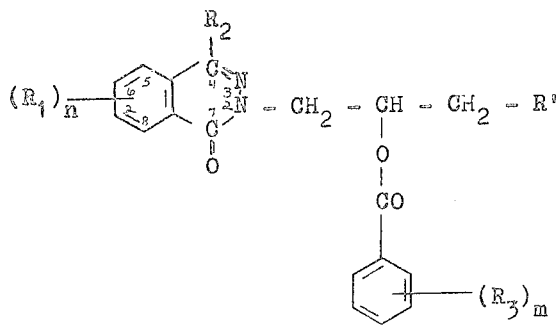

and their pharmaceutically acceptable acid salts, wherein R' stands for a secondary aliphatic, cycloaliphatic
or araliphatic amine radical having 2 to 10 carbon atoms or the radical of a 5, 6 or 7-membered saturated heterocyclic amine, optionally containing an additional N, O or S hetero atom,
$R_1$ represents hydrogen or an alkoxy group having 1 to 4 carbon atoms,
$R_2$ represents hydrogen or an alkyl or aralkyl group,
$R_3$ represents an alkoxy group having 1 to 4 carbon atoms,
m is 1, 2 or 3 and
n is 2 or 3, the groups $R_1$ being attached if present to the phthalazine nucleus in the 6 and 7, 7 and 8 or 5, 6 and 7 positions.

The secondary amine radical R' may be derived from an aliphatic mono- or diamine, such as a dialkylamine, alkylalkenylamine, alkylenediamine, hydroxyalkylamine or alkoxyalkylamine.

Suitable amines are for instance: dimethylamine, diethylamine, N-allyl-N-methylamine, N,N-diethyl-N'-methylethylenediamine, N,N-diethyl-N'-methylpropylenediamine, N-methylethanolamine, N-methylpropanolamine, N-isopropylethanolamine, N-butylethanolamine, N-benzylethanolamine, N-methyl-N-(γ-methoxypropyl)amine or N-methyl-N-(γ-ethoxypropyl)amine.

Cycloaliphatic amines may be, for instance, N-methylcyclopropylamine, N-methylcyclohexylamine.

Araliphatic amines may be, for instance, phenalkylalkylamines such as N-benzyl-N-methylamine or N-phenethyl-N-methylamine.

Radicals of heterocylic amines may be, for instance, pyrrolidino, morpholino, thiomorpholino, piperidino, N-methyl-piperazino, N-phenylpiperazino, 4-(β-hydroxyethyl)piperazino(1), N-(γ-hydroxypropyl)-piperazino, hexamethyleneimino radicals.

The 1(2H)-phthalazinone derivatives of the present invention are obtained by acylating, optionally in the presence of an acid-binding agent, 1(2H)-phthalazinones of the general formula

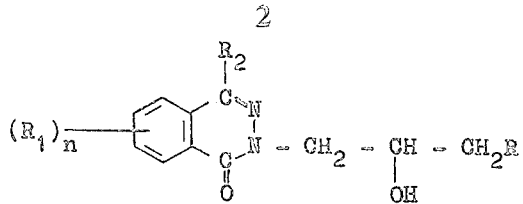

wherein $R_1$ and $R_2$ have the meanings given above, and R is either defined as R' above or, where R' would contain an acyloxy radical of the general formula

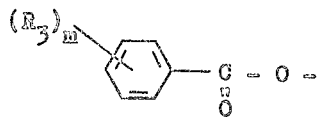

R may represent the radical of the corresponding hydroxy compound in which the acyloxy group is replaced by a hydroxy group, with an alkoxy benzoic acid of the general formula

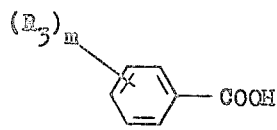

or a reactive derivative thereof.

If, in the process described above, initial products are employed wherein R contains a hydroxyalkyl group, and if 2 mols of alkoxy benzoic acid or of a reactive derivative thereof are employed per mol of starting compound the corresponding diester is obtained.

The 2-γ-amino-β-hydroxy-propyl-1(2H)-phthalazinones required as starting materials for the above process may be obtained in various ways known per se. Thus, they may be prepared a. by condensing a 1(2H)-phthalazinone derivative of the general formula

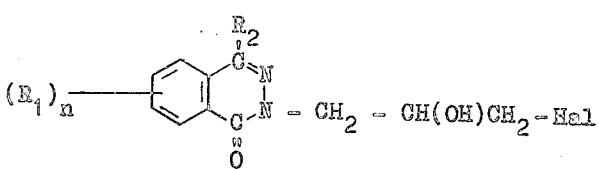

which is substituted in the 2-position by a γ-halogeno-β-hydroxypropyl radical, or the corresponding epoxy compound, with a secondary amine of the general formula RH, or b. by reacting a 1(2H)-phthalazinone of the general formula

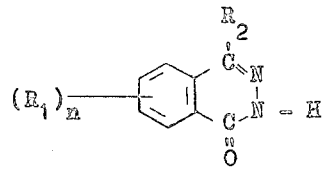

with a γ-halogeno-β-hydroxypropylamine of the general formula

Hal—CH₂—CH(OH)CH₂—R or c. by cyclizing an ortho-acyl benzoic acid of the general formula

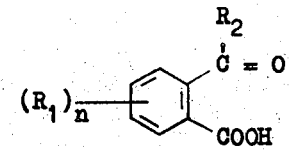

with a γ-amino-β-hydroxy-propylhydrazine of the general formula

R—CH₂—CH(OH)CH₂—NH—NH₂.

In each case, $R_1$, $R_2$, R and n are as defined above.

The 1(2h)-phthalazinone derivatives of the present invention are valuable pharmaceuticals. In particular, they are excellent coronary dilators and, in this respect, superior to other known substances of this kind. They may be utilized in pharmaceutical preparations together with a conventional pharmaceutically acceptable diluent or carrier.

A pharmacological investigation of the vasodilator action on the coronary vessels, with respect to the change in the oxygen tension in the coronary veinous blood, was carried out on dogs according to the methods described by W.K.A. Schaper and his co-workers (see W.K.A. SCHAPER, R. XHONNEUX, and J.M. BOGAARD "Uber die kontinuierliche Messung des Sauerstoffdruckes in venosen Coronarblut" (Naunyn-Schmiedeberg's Arch. exp. Path. u. Pharmak. 245, 383–389 (1963). The test preparations were applied intravenously to narcotized and spontaneously breathing animals. Under these test conditions, dilation of the coronary arteries caused by the test substances along with an increase in the coronary blood flow led to an increase in the oxygen tension in the coronary veinous blood. This oxygen tension was measured polarographically by means of a platinum electrode of the Gleichmann-Lubbers type (see U. GLEICHMANN and D.W. LUEBBERS "Die Messung des Sauerstoffdruckes in Gasen und Flussigkeiten mit der Platin-Elektrode unter besonderer Berucksichtigung der Messung im Blut," Pflugers Arch. 271, 431–455 (1960). The heart rate was continuously measured by electronic methods from the systolic peaks of the arterial blood pressure. The arterial blood pressure was measured in the known manner in the femoral artery with the aid of an electromanometer of the Statham strain-gauge type.

The following table gives the results of the pharmacological investigations which were carried out. The preparations were tested in the form of their respective hydrochlorides.

| Preparation | LD 50 g./kg. mouse i.v. | Dosage mg./kg. i.v. | Maximal increase in oxygen tension in the coronary veinous blood | | Maximal change in heart rate | | Maximal change in blood pressure (systolic/diastolic) | |
|---|---|---|---|---|---|---|---|---|
| | | | in % | in minutes | in % | in minutes | in % | in minutes |
| 2-[γ-pyrrolidino-β-(3,4,5-trimethoxy-benzoxy)-propyl]-5,6,7-trimethoxy-1(2H)-phthalazinone | 0,0675 | 0,1 | +40 | 90 | +39 | 90 | −10/−10 | 90 |
| 2-[γ-diethylamino-β-(3,4,5-trimethoxy-benzoxy)-propyl]-5,6,7-trimethoxy-1(2H)-phthalazinone | 0,06 | 0,05 | +66 | 20 | — | — | −3/±0 | 3 |
| 2-[γ-(N-methyl-N-methoxypropyl-amino)-β-(3,4,5-trimethoxy-benzoxy)-propyl]-5,6,7-trimethoxy-1(2H)-phthalazinone | 0,04 | 0,05 | +41 | >50 | +28 | 25 | — | — |
| 2-[γ-morpholino-β-(3,4,5-trimethoxy-benzoxy)-propyl]-5,6,7-trimethoxy-1(2H)-phthalazinone | 0,14 | 0,1 | +105 | 25 | −4 | 45 | −24/−15 | 25 |
| 2-[γ-morpholino-β-(3,4,5-triethoxy-benzoxy)-propyl]-5,6,7-trimethoxy-1(2H)-phthalazinone | 0,14 | 0,1 | +106 | 35 | −21 | 35 | — | 35 |
| 2-[γmorpholino-β-(3,5-diethoxy-4-n-butoxy-benzoxy)-propyl]-5,6,7-trimethoxy-1(2H)-phthalazinone | 0,115 | 0,1 | +134 | >55 | +4 | >55 | −12/−26 | >55 |
| 2-[γ-(4'-β-3,4,5-trimethoxybenzoxy-ethyl-piperazino[1'])-β-(3,4,5-trimethoxy-benzoxy)-propyl]-5,6,7-trimethoxy-1(2H)-phthalazinone | — | 0,05 | +108 | 30 | +15 | 30 | +8/−6 | 5 |
| 2-[γ-(N-methyl-N-cyclohexyl-amino)-β-(3,4,5-trimethoxy-benzoxy)-propyl-5,6,7-trimethoxy-1(2H)-phthalazinone | 0,1 | 0,05 | +43 | 70 | +39 | 35 | −10/−31 | 10 |

—Continued

| Preparation | LD 50 g./kg. mouse i.v. | Dosage mg./kg. i.v. | Maximal increase in oxygen tension in the coronary veinous blood | | Maximal change in heart rate | | Maximal change in blood pressure (systolic/ diastolic) | |
|---|---|---|---|---|---|---|---|---|
| | | | in % | in minutes | in % | in minutes | in % | in minutes |
| 2-[γ-(4'-methyl-piperazino[1'])-β-(3,4,5-trimethoxy-benzoxy)-propyl]-5,6,7-trimethoxy-1(2H)-phthalazinone | 0,12 | 0,1 | +41 | 10 | +7 | >5 | — | — |
| 2-[γ-(N-methyl-N-benzyl-amino)-β-(3,4,5-trimethoxy-benzoxy)-propyl]-5,6,7-trimethoxy-1(2H)-phthalazinone | 0,15 | 0,05 | +83 | 20 | — | — | −10/−5 | 20 |
| 2-[γ-(perhydro-azepinyl-[1'])β-(3,4,5-trimeth-oxybenzoxy)-propyl]-5,6,7-trimethoxy-1(2H)-phthalazinone | — | 0,1 | +37 | >35 | — | — | — | — |
| 2-[γ-piperidino-β-(3,4,5-trimethoxy-benzoxy)-propyl]-5,6,7-trimethoxy-1-(2H)-phthalazinone | 0,1 | 0,1 | +100 | 55 | +22 | 55 | −9/−23 | 55 |
| comparative substance: | | | | | | | | |
| 3-(γ-diethylamino-β-hydroxy-propyl)-4-methyl-7-ethoxy-carbonyl-methoxy-coumarine according to French Patent 5019 BSM | | 2,0 | +118 | 65 | | | | |

The following examples are given for the purpose of a better understanding of the nature and the objects of this invention. The temperatures are given in degrees Centigrade.

EXAMPLE 1

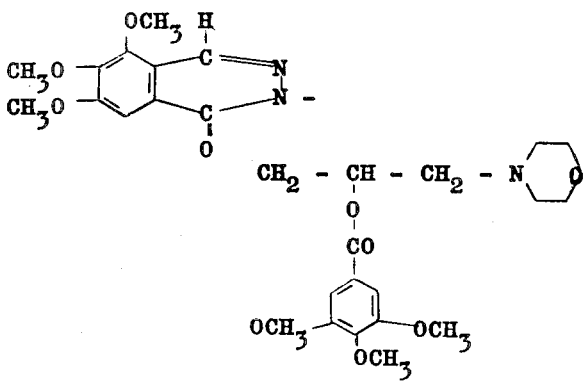

37.9 g. (0.1 mol) 2-(γ-morpholino-β-hydroxy-propyl)5,6,7-trimethoxy-1(2H)-phthalazinome are dissolved in 400 c.c. chloroform and admixed with 11.1 g. (0.11 mol) triethylamine. A solution consisting of 25.3 g. (0.11 mol) 3,4,5-trimethoxybenzoyl chloride in 80 c.c. chloroform is then added dropwise while stirring for 30 minutes at room temperature. Stirring is continued for one hour at room temperature. The reaction mixture is then heated to the boil and stirred again for 8 hours under reflux. After cooling down, it is evaporated to dryness in vacuo. The residue is dissolved with stirring in dilute hydrochloric acid and the solution thus obtained is filtered so as to become limpid. The aqueous hydrochloric acid solution is rendered alkaline by the introduction of solid potassium carbonate and the separating reaction product is dissolved in ethyl acetate. After drying over potassium carbonate, one obtains by introducing gaseous hydrogen chloride into the ethyl acetate solution the 2-[γ-morpholine-β-(3,4,5-trimethoxybenzoxy)-propyl]-5,6,7-trimethoxy-1(2H)-phthalazinone hydrochloride in the form of colorless crystals melting at 194°– 196°.

Yield: 48 g. (= 78.6 % of the theoretical). b. The 2-(γ-morpholino-β-hydroxy-propyl)-5,6,7-trimethoxyl(2H)-phthalazinone required above as a starting compound may be prepared as follows:

23.6 g (0.1 mol) 5,6,7-trimethoxy-1(2H)-phthalazinone are introduced while stirring at room temperature into a solution consisting of 7 g (0.1 mol) potassium methylate in 120 c.c. methanol. The reaction mixture is evaporated to dryness in vacuo and the remaining potassium salt is suspended in 300 c.c. anhydrous toluene. A solution consisting of 19.8 g (0.11 mol) N-(γ-chloro-β-hydroxypropyl)-morpholine in 40 c.c. anhydrous dimethylsulfoxide is then added dropwise and stirring is continued overnight at 80°. After cooling, the reaction mixture is triturated with water and the toluene layer is separated. The toluene phase is extracted several times with dilute hydrochloric acid. The combined hydrochloric acid solutions are filtered till clear and rendered alkaline by the addition of potassium carbonate. The base layer which separates is then dissolved in methylene chloride. The residue obtained after concentrating the methylene chloride is recrystallized from ethyl acetate. 2(γ-morpholinoβ-hydroxypropyl)-5,6,7-trimethoxy-1(2H)-phthalazinone is obtained in the form of colorless needles melting at 108°–109°.

Yield: 30 g (= 79% of the theoretical).

c. The same intermediate may also be prepared as follows:

24 g (0.1 mol) 3,4,5-trimethoxy-phthalaldehydic acid are suspended in 300 c.c. water and admixed with 17.5 g (0.1 mol) γ-morpholino-β-hydroxy-propyl-hydrazine.

The reaction mixture is then heated to boiling point and stirred for 2 hours at 100°. After cooling, the reaction product is filtered off by suction, washed with water and dried in vacuo.

Yield: 28 g (= 73.8% of the theoretical). m.p.: 108°

EXAMPLE 2

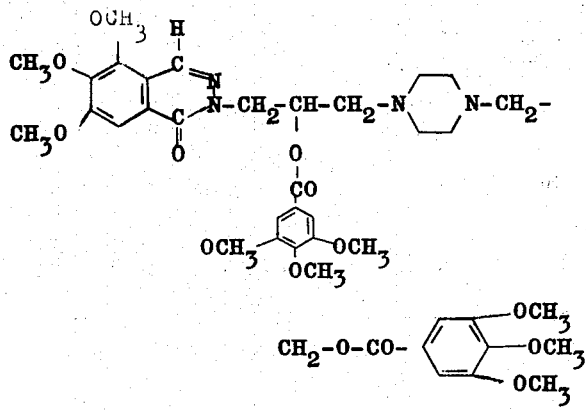

42.2 g. (0.1 mol) 2-[γ-(4'-β-hydroxyethylpiperazino[1-]-β-hydroxy-propyl]-5,6,7-trimethoxy-1(2H)-phthalazinone are dissolved in 300 c.c. anhydrous chloroform and admixed with 30.3 g. (0.3 mol) 3,4,5-trimethoxybenzoyl chloride in 200 c.c. anhydrous chloroform is then added dropwise while stirring at room temperature and stirring is continued for another 2 hours at room temperature. The reaction mixture is then heated to be boild and stirring is continued for another 10 hours under reflux. After cooling down, the reaction mixture is concentrated in vacuo and the residue is dissolved in dilute hydrochloric acid and filtered so as to become limpid. The aqueous hydrochloric acid solution is then rendered alkaline by the addition of potassium carbonate and the separating reaction product is dissolved in ethyl acetate. After drying over potassium carbonate one obtains by introducing gaseous hydrogen chloride the 2-[γ-(4'-β-3,4,5-trimethoxybenzoxyethyl-piperazino[1']) -β-(3,4,5-trimethoxybenzoxy)-propyl]-5,6,7-trimethoxy-1(2H)-pthalazinone dihydrochloride in the form of colorless needles melting at 190°.

Yield: 57 g. (= 64 % of the theoretical).

The 2-[γ-(4'-β-hydroxyethyl-piperazino [1']-β-hydroxyl-propyl]-5,6,7-trimethoxy-1(2H)-phthalazinone required as starting material may be prepared as follows:

29.2 g. (0,1 mol) 2-(2',3'-epoxypropyl)-5,6,7-trimethoxy-1(2H)-phthalazinone and 39 g. (0.3 mol) N-β-hydroxyethyl-piperazine are dissolved in 250 c.c. alcohol and then stirred for 12 hours under reflux. The limpid reaction solution is freed in vacuo from the solvent and the excess N-β-hydroxyethyl-piperazine. The residue is recrystallized from ethyl acetate. 2-[γ-(4'-β-hydroxyethyl-piperazino[1'])-β-hydroxy-propyl]5,6,7-trimethoxy-1(2H)-phthalazinone is obtained in the form of colorless crystals melting at 111° – 112°.

Yield: 32 g (= 76% of the theoretical).

c. The same product is also obtained by reacting 2-(3'-chloro-2'-hydroxy-propyl)-5,6,7-trimethoxy-1(2H)-phthalazinone, prepared by addition of hydrogen chloride to 2-(2',3'-epoxypropyl)-5,6,7-trimethoxy-1(2H)-phthalazinone, with N-β-hydroxethyl-piperazine, in known manner.

The 2-(2',3'-epoxypropyl)-5,6,7-trimethoxy-1(2H)-phthalazinone required as intermediate is obtained by reacting 5,6,7-trimethoxy-1(2H)-phthalazinone with epichlorohydrin as follows;

23.6 g (0.1 mol) 5,6,7-trimethoxy-1(2H)-phthalazinone are dissolved in 100 c.c. dimethylsulfoxide and 11.2 g (0.1 mol) potassium tert. butylate are added. The reaction mixture is stirred for 2 hours at 30° – 35° and admixed with 30 g. (0.324 mol) epichlorohydrin. After 12 hours' stirring at room temperature, it is poured into 800 c.c. water and extracted several times with ethyl acetate. The combined ethyl acetate extracts are washed first with dilute sodium hydroxide solution and then with water. After drying, the organic phase is concentrated in vacuo. The residue is recrystallized from petroleum ether. 2-(2',3'-epoxypropyl)-5,6,7-trimethoxy-1(2H)-phthalazinone is obtained in the form of colorless crystals melting at 107° – 108°. Yield: 21 g (= 72% of the theoretical).

EXAMPLE 3 a. Starting compounds of the following general formula are prepared by methods analogous to those described in paragraphs (b) and (c) of Examples 1 and 2, $(R_1)_n$, $R_2$ and $R'$ being as defined in the table:

General formula:

| $(R_1)_n$ | $R_2$ | $R'$ | m.p. |
|---|---|---|---|
| H | H | -N⟨O⟩ (morpholino) | 108° |
| H | —CH₃ | " | 120° |
| H | —CH₂C₆H₅ | " | 172° |
| 6,7—(OCH₃)₂ | H | " | 142° |
| " | H | —N(C₂H₅)₂ | 94° |
| 7,8—(OCH₃)₂ | H | " | oily |
| 5,6,7—(OCH₃)₂ | H | " | 75° |
| " | H | —N(CH₃)CH₂CH₂CH₂OCH₃ | 54° |
| " | H | —N(CH₃)CH₂—CH=CH₂ | 60° |
| " | H | —N(CH₃)CH₂C₆H₅ | oily |
| " | H | —N(CH₃)–⟨cyclohexyl⟩ | 58° |
| " | H | -N⟨▢⟩ | 120° |
| " | H | -N⟨⬡⟩ | 123° |
| " | H | -N⟨⬢⟩ | 93° |
| " | H | -N⟨N-CH₃⟩ | 121° |

Analogously to the prescription given in para 1 of Examples 1 and 2 the following compounds of the present invention are prepared from the above initial products:

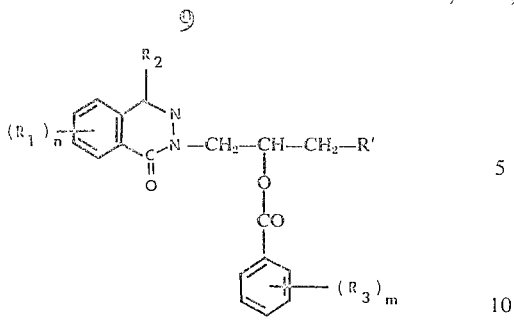

| $(R_1)_n$ | $R_2$ | $(R_3)_m$ | R' | m.p. (HCl) |
|---|---|---|---|---|
| H | H | 3,4,5—$(OCH_3)_3$ | —N(morpholino) | 140° |
| H | —$CH_3$ | " | " | 134° |
| H | —$CH_2C_6H_5$ | " | " | 132° |
| 6,7—$(OCH_3)_2$ | H | " | " | 160° |
| 7,8—$(OCH_3)_2$ | H | " | —$N(C_2H_5)_2$ | 139° |
| 5,6,7—$(OCH_3)_3$ | H | " | " | 92° decomp. |
| " | H | " | " | 191° |
| " | H | " | $N(CH_3)CH_2CH_2CH_2OCH_3$ | 156° |
| " | H | " | $N(CH_3)$—$CH_2$—CH=$CH_2$ | 73° decomp. |
| " | H | " | $N(CH_3)CH_2C_6H_5$ | 92° decomp. |
| " | H | " | $N(CH_3)$—(cyclohexyl) | 90° decomp. |
| 5,6,7—$(OCH_3)_3$ | H | 3,4,5—$(OCH_3)_3$ | —N(pyrrolidino) | 139° |
| " | H | " | —N(piperidino) | 185° |
| " | H | " | —N(hexahydroazepino) | 87° |
| " | H | " | —N(piperazino)N—CH | 138° |
| " | H | 3,4,5—$(OC_2H_5)_3$ | —N(morpholino) | 179° |
| " | H | 3,5—$(OCH_3)_2$4—$OC_4H_9$ | " | 150° |

What is claimed is:

1. Basically substituted 1(2H)-phthalazinone derivatives having the general formula

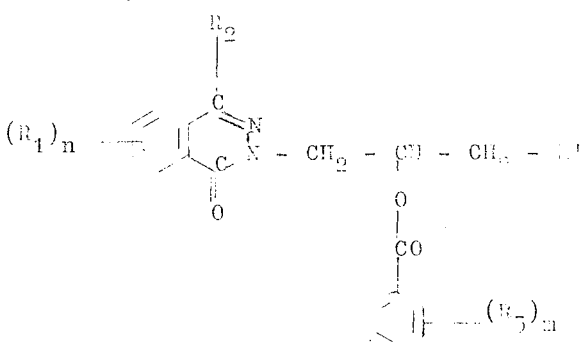

and their pharmaceutically acceptable acid addition salts, wherein R' stands for a radical selected from the group consisting of 5,6 or 7-membered heterocyclic nitrogen bases, which contain in addition to the nitrogen atom a corresponding number of methylene groups as well as, optionally, an additional member selected from the group consisting of a nitrogen, an oxygen and a sulfur atom, said radical being bound via a nitrogen atom, $R_1$ stands for a member selected from the group consisting of a hydrogen atom and an alkoxy radical having 1 to 4 carbon atoms, which radical may be in the 6,7 7,8 or 5,6,7 position of the phthalazine nucleus, $R_2$ is a member selected from the group consisting of hydrogen, methyl or benzyl;

$R_3$ stands for alkoxy groups having 1 to 4 carbon atoms, m is an integer selected from 1, 2 and 3 and n is an integer selected from 2 and 3.

2. Basically substituted 1(2H)-phthalazinone derivatives as claimed in claim 1, wherein R' is a radical selected from the group consisting of morpholino, piperidino, pyrrolidino, hexahydroazepino, N-methyl-piperazino, thiomorpholino, N-methyl-N-piperidino-propylamino and N-(3,4,5-trimethoxybenzoxy-ethyl)-piperazino said radical containing not more than 10 carbon atoms.

3. 2-[γ-morpholino-β-(3,4,5-triethoxy-benzoxy)-propyl]-5,6,7-trimethoxy-1(2H)-phthalazinone and pharmaceutically acceptable acid addition salts thereof.

4. 2-[γ-morpholiino-β-(3,5-diethoxy-4-n-butoxy-benzoxy)-propyl]-5,6,7-trimethoxy-1(2H)-phthalazinone and pharmaceutically acceptable acid addition salts thereof.

5. 2-[γ-piperidino-β-(3,4,5-trimethoxy-benzoxy)-propyl]-5,6,7-trimethoxy-1-(2H)-phthalazinone and pharmaceutically acceptable acid addition salts thereof.

6. 2-[γ-(4'-β-3,4,5-trimethoxybenzoxy-ethyl-piperazino [1']-β-(3,4,5-trimethoxy-benzoxy)-propyl]-5,6,7-trimethoxy-1(2H)-phthalazinone and pharmaceutically acceptable acid addition salts thereof.

* * * * *